Dec. 2, 1969 R. W. RACINE ETAL 3,480,975
RETRACTABLE BED
Filed June 14, 1967  2 Sheets-Sheet 2

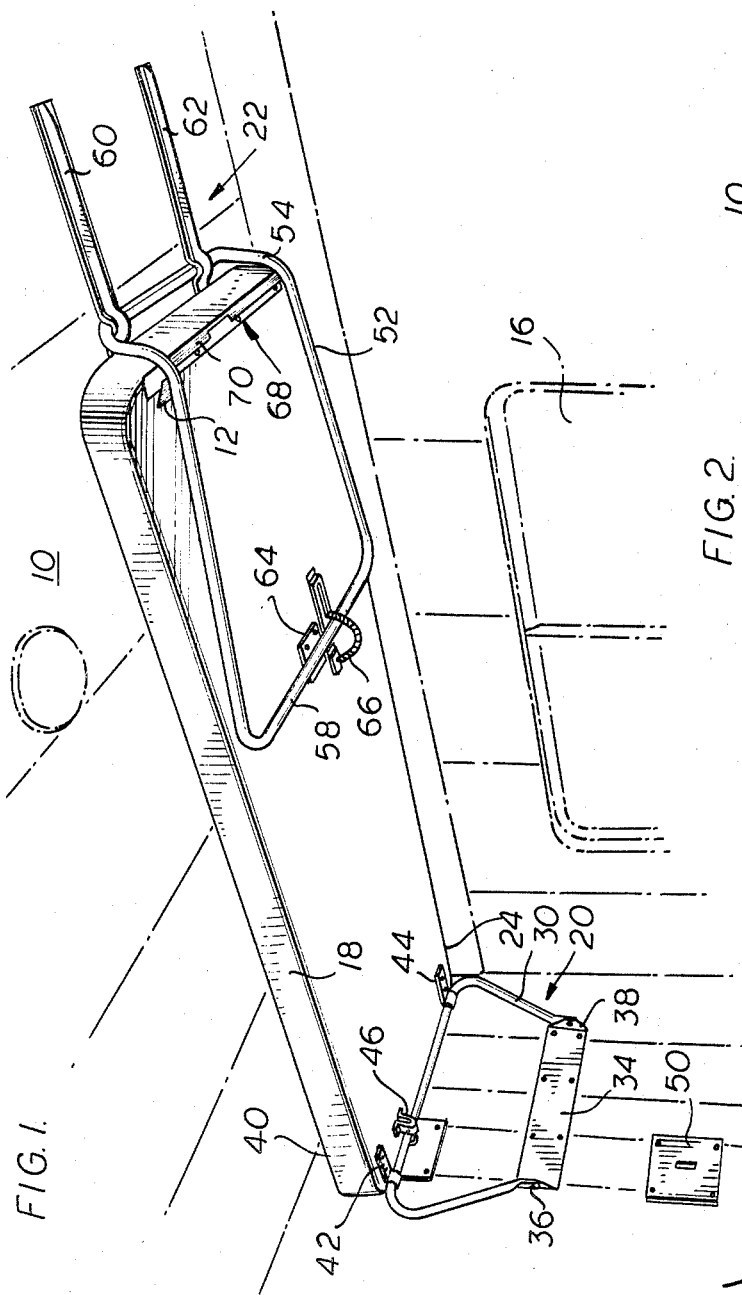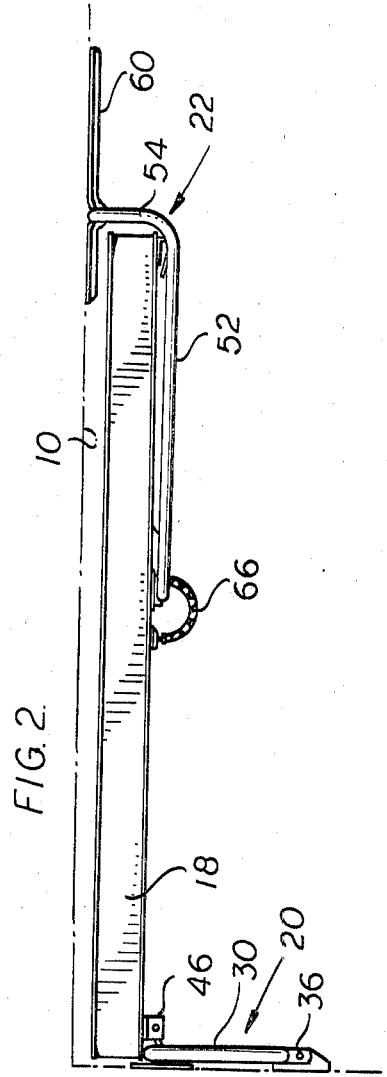

INVENTORS
RICHARD W. RACINE
MAX E. COLCHIN
ATTY

United States Patent Office 3,480,975
Patented Dec. 2, 1969

3,480,975
RETRACTABLE BED
Richard W. Racine and Max E. Colchin, Fort Wayne, Ind., assignors to International Harvester Company, Chicago, Ill., a corporation of Delaware
Filed June 14, 1967, Ser. No. 646,030
Int. Cl. A47c *17/84;* B60n *3/00*
U.S. Cl. 5—118                        13 Claims

ABSTRACT OF THE DISCLOSURE

A bed or bunk arrangement for a camping vehicle wherein the bed is supported on pivotally movable supports and is adapted to be moved from its normal use position to a storage position near the ceiling of the vehicle.

---

This invention relates to beds and more specifically to a retractable bed for use in a vehicle or other environment where space is at a premium.

A principal object of this invention is to provide a bed or bunk which may be easily shifted between use and storage positions.

Another object of this invention is to provide simple bed supports which may be manipulated easily to move the bed between use and storage positions.

Another object is to provide a suspended bed arrangement whereby one end of the bed is supported from an adjacent end wall and the other end is supported from the ceiling and in which the support means at each end are pivotally arranged to facilitate moving the bed from a use position to a storage position adjacent the ceiling and vice versa.

The above and other objects and advantages of the invention will be more readily apparent when read in conjunction with the accompanying drawings in which:

FIGURE 1 is a perspective view showing a bed embodying the invention disposed in a storage position adjacent the ceiling of a vehicle unit;

FIGURE 2 is a side view of the bed of FIGURE 1 showing the bed in a storage position;

Figure 3:
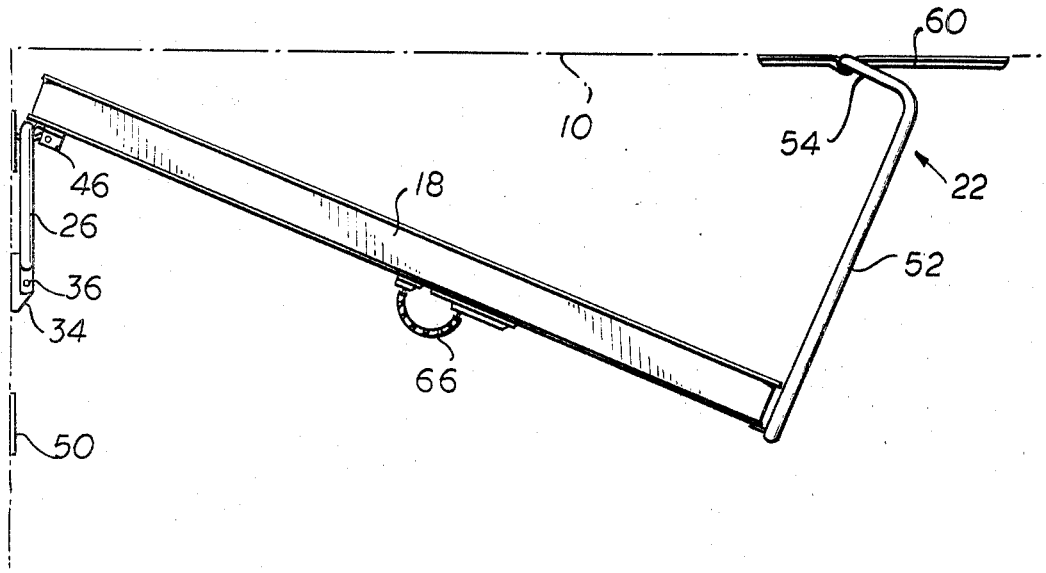
FIGURE 3 is a side view of the bed of FIGURE 1 in an intermediate position it would assume in being moved from a storage position to a use position or vice versa.

Referring now to the drawings in which identical reference characters in the several views denote similar parts, FIGURE 1 shows a partial interior of a vehicle camping unit. Although the invention is described herein with reference to such a camping unit, it will be apparent that this type of bed and its means of support could be utilized in other environments, and would be especially useful in environments where space is at a premium such as boats, for example. The camping unit as shown herein comprises in part a ceiling 10, a sidewall 12 running the length of the vehicle and joining the ceiling, and a vertically extending end wall section 14 joining the ceiling and the sidewall 12. A window 16 is shown formed in the sidewall 12. A bed 18 is disposed along the sidewall 12 and is supported at one end from the end wall 14 by support means designated generally as 20. At the other end, the bed 18 is suspended from the ceiling 10 by support means designated generally as 22. The bed 18 includes a frame member 24.

The support means 20 may comprise a generally U-shaped tubular bracket 26, having two leg portions 28 and 30 and a cross arm member 32 which may be formed integrally therewith. A mounting plate 34 secured to the wall 14 by suitable means has a pair of protruding flanges to which leg portions 28 and 30 are connected by pivotal connections 36 and 38. One end 40 of the bed 18 is pivotally attached to the cross arm member 32 of the bracket 26 by suitable means such as metal straps 42 and 44 secured to the bed frame 24. Thus the bed 18 is able to pivot with respect to the bracket 26 as seen from FIGURE 3, and the bracket 26 is able to swing 180° about pivotal connections 36 and 38 as seen by reference to FIGURES 3 and 4.

Figure 4:
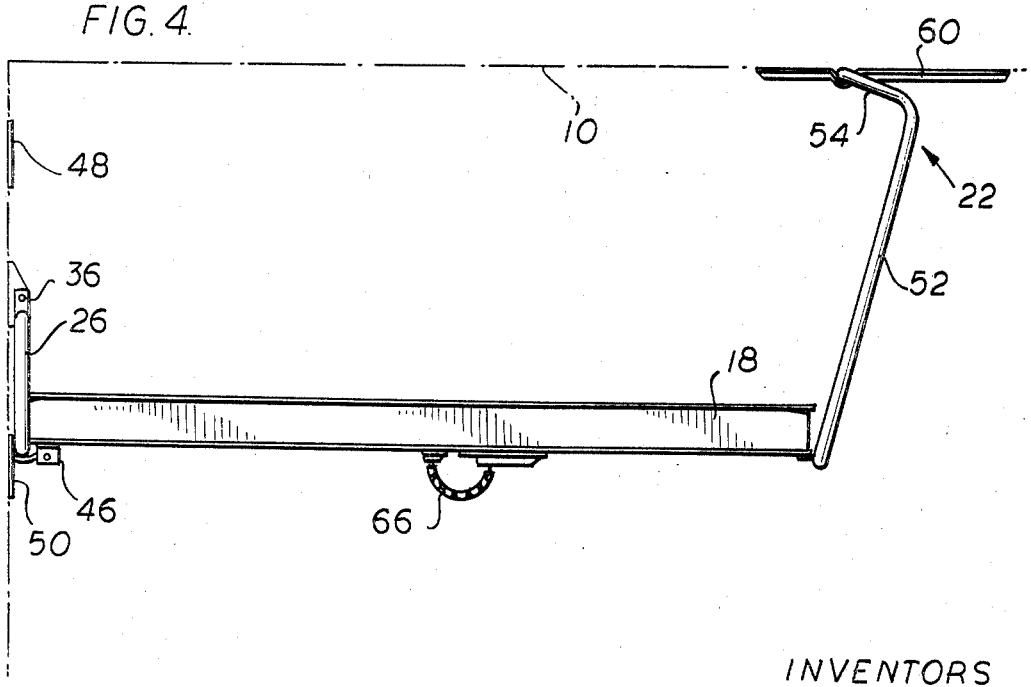
FIGURE 4 is a side view of the bed of FIGURE 1 in a use position.

A spring latch mechanism 46 is secured to the bed frame 24 and is adapted to cooperate with latch retainer 48 mounted on end wall 14 when the bed 18 is in a storage position as shown in FIGURE 1. This prevents movement of the bed away from the end wall. When the bed 18 is in a use or sleeping position as shown in FIGURE 4, the latch mechanism 46 cooperates with latch retainer 50 mounted on end wall 14 to secure the end of bed 18 against movement away from the end wall.

The support means 22 for supporting the other end of the bed is pivotally suspended from the ceiling 10. Support means 22 may comprise a substantially rectangular shaped tubular bracket structure 52, one end 54 thereof being formed at approximately right angles to the remainder of the structure. It includes at opposite ends two cross-bar members 56 and 58. Cross-bar member 56 is pivotally secured to the ceiling 10 by metal strap-like members 60 and 62. As clearly seen in FIGURE 2, the end 54 of bracket 52 is of such a length that the bracket 52 nicely curves around the end of the bed 18.

A suitable latch member 64, preferably of a spring action type, is secured to the bed frame 24 to secure cross-bar 58 of the bracket 52 in place when the bed is in a storage position as seen in FIGURE 1. A safety chain arrangement 66 may be mounted on the bed frame 24 to back up the support for the bracket member 52 in the event of failure of the latch member 64.

A latching mechanism 68 is secured to the right end of the bed frame 24 as viewed in FIGURES 1 and 2 for securing the cross-bar 58 of the bracket 52 in place when the bed is in a use position. The retaining mechanism 68 may comprise a longitudinally extending bracket 70 secured to the underside of the frame 24 to receive the cross-bar 58. The bracket 70 may extend substantially the full width of the bed frame. It may be formed with a curvature as seen in FIGURES 1 and 3 to match the contour of the cross-bar 58. A retainer 72, which may be spring actuated, cooperates with the bracket 70 to secure the cross-bar 58 in position.

When the bed 18 is to be moved from the storage position of FIGURE 1, the latch member 64 and the safety chain 66 are disconnected, permitting the support bracket 52 to swing downwardly about the pivotal connection provided by strap members 60 and 62. The right end of the bed is permitted to swing downwardly about its pivotal connection to cross-bar 32 of support bracket 28 at the left end of the bed. The cross-bar 58 of support bracket 52 is then engaged with latching mechanism 68 assuming a position as shown in FIGURE 3. Then the latch mechanism 46 securing the left end of the bed 18 to the wall 14 is released. This permits simultaneous pivotal movement to take place at both ends of the bed. At the left end, as viewed in FIGURE 1, the bed pivots on cross-bar 32 of support bracket 26 and bracket 26 pivots on the mounting plate 34 through pivots 36 and 38. At the right end, of course, the support bracket 52 pivots from the ceiling in the strap-like retaining members 60 and 62. When the bed is in place as shown in FIGURE 4, the latch 46 engages the latch retainer 50 and the bed is secured against longitudinal movement.

In raising the bed 18 from a use to a storage position, it will be apparent that the reverse procedure takes place. The latch 46 is released, the bed is swung to the right as seen in FIGURE 4, and the left end is raised to the position of FIGURE 3. Then retainer 72 is released permitting the right end of the bed to be swung upwardly and the support bracket 52 up under the bed to be engaged by latch member.

Thus it is seen that we have advantageously provided means for simply suspending a bed unit and providing simple and convenient means for moving the bed between use and storage positions as desired. Furthermore, it will be appreciated that the total mechanism is uncomplicated and easy to manufacture.

We claim:
1. In a vehicle unit:
   a ceiling,
   a wall section disposed vertically with respect to the ceiling,
   a bed movable between storage and use positions, said bed being adjacent said ceiling and one end thereof adjacent said wall section when in its storage position and said bed being spaced vertically below said ceiling and said one end thereof adjacent said wall when in its use position,
   first pivotal support means for supporting one end of said bed from said wall section when said bed is in its storage position and in its use position, and
   second pivotal support means for supporting the other end of said bed from said ceiling when said bed is in its storage position and in its use position.

2. The combination of claim 1 wherein said first pivotal support means includes a substantially U-shaped bracket the legs of which are pivotally connected to said wall and the cross-arm of which is pivotally connected to the underside of said bed.

3. The combination of claim 1 wherein said second pivotal support means includes a bracket pivotally secured to said ceiling, and means for selectively and releasably connecting said bracket to said bed at either one of two spaced locations, said bracket being connected to said bed at one of said locations when said bed is in its storage position and being connected to said bed at the other of said locations when said bed is in its use position.

4. The combination of claim 1 wherein:
   said first pivotal support means includes a substantially U-shaped bracket having legs which are pivotally connected to said wall and a cross-arm member extending between said legs which is pivotally connected to the underside of said bed, and
   said second pivotal support means includes a second bracket pivotally secured to said ceiling and releasably connected to the underside of the bed.

5. The combination of claim 1 including releasable latch means including a part carried by the normal underside of said bed for selectively securing said one end of said bed against said wall section when said bed is both in its storage and use positions.

6. The combination of claim 1 wherein:
   said second pivotal support means comprises a support bracket pivotally secured to said ceiling, and further includes:
      first latch means at said other end of said bed for releasably securing said bracket to said bed when said bed is in a use position, and
      second latch means intermediate the ends of said bed for releasably securing said bracket to said bed when said bed is in a storage position.

7. The combination of claim 1 also including:
   first latch means for releasably securing said one end of said bed to said wall in either the use or storage position,
   second latch means at said other end of said bed for releasably securing said second support means to said bed when said bed is in a use position, and
   third latch means intermediate the ends of said bed for releasably securing said second support means to said bed when said bed is in a storage position.

8. The combination of claim 2 wherein said U-shaped bracket is formed with certain portions of said legs thereof sufficiently widely spaced to allow said bed to extend between said legs when the bed is in a use position.

9. The combination of claim 6 including a safety arrangement on said bed and associated with said second pivotal support means to assist in maintaining said bed in its storage position.

10. In a vehicle unit having a ceiling and wall section disposed vertically with respect to the ceiling, the combination comprising:
    a bed movable between storage and use positions, said bed being adjacent the ceiling and one end thereof adjacent said wall section when in its storage position, and said bed being spaced vertically below said ceiling and said one end thereof adjacent said wall section when in its use position,
    first support means pivotally connected to said one end of said bed and adapted to be pivotally connected to the wall section, said first support means being effective to support said one end of said bed when in its storage and use position, and
    second support means associated with the other end of said bed and adapted to be pivotally connected to the ceiling, said second support means being operatively connected to said other end of said bed and being effective to support said other end of said bed when in its storage and use positions.

11. The combination of claim 10 wherein said first support means comprises a substantially U-shaped member the legs of which are adapted to be pivotally attached to the wall section and the cross arm of which is pivotally connected to one end of said bed.

12. The combination of claim 10 wherein:
    said second support means comprises a bracket adapted to be pivotally connected to the ceiling, said combination further including:
       first means for releasably connecting said bracket to said other end of said bed when said bed is in a use position, and
       second means for releasably connecting said bracket to a position intermediate the ends of said bed when said bed is in a storage position.

13. The combination of claim 10 including latch means at said one end of said bed for securing said one end to the wall section against which said one end is adapted to be positioned.

References Cited

UNITED STATES PATENTS

| | | | |
|---|---|---|---|
| 1,945,875 | 2/1934 | Woller | 5—10 |
| 1,472,491 | 10/1923 | Peck | 5—10 |
| 21,600 | 9/1858 | Creighton | 5—10 |

BOBBY R. GAY, Primary Examiner

ANDREW M. CALVERT, Assistant Examiner

U.S. Cl. X.R.

114—192; 296—19